(12) United States Patent
Cambias et al.

(10) Patent No.: US 11,170,224 B2
(45) Date of Patent: Nov. 9, 2021

(54) KEYFRAME-BASED OBJECT SCANNING AND TRACKING

(71) Applicant: VanGogh Imaging, Inc., McLean, VA (US)

(72) Inventors: Craig Cambias, Silver Spring, MD (US); Ken Lee, Fairfax, VA (US); Xin Hou, McLean, VA (US); Jun Yin, McLean, VA (US); Huy Bui, McLean, VA (US)

(73) Assignee: VanGogh Imaging, Inc., McLean, VA (US)

(*) Notice: Subject to any disclaimer, the term of this patent is extended or adjusted under 35 U.S.C. 154(b) by 146 days.

(21) Appl. No.: 16/421,822

(22) Filed: May 24, 2019

(65) Prior Publication Data
US 2019/0362157 A1 Nov. 28, 2019

Related U.S. Application Data

(60) Provisional application No. 62/789,309, filed on Jan. 7, 2019, provisional application No. 62/676,507, filed on May 25, 2018.

(51) Int. Cl.
*G06K 9/00* (2006.01)
*G06T 7/73* (2017.01)
(Continued)

(52) U.S. Cl.
CPC ....... *G06K 9/00744* (2013.01); *G06K 9/6256* (2013.01); *G06N 3/08* (2013.01);
(Continued)

(58) Field of Classification Search
CPC ............ G06K 9/00744; G06K 9/3241; G06K 9/00201; G06K 9/6256; G06N 20/00;
(Continued)

(56) References Cited

U.S. PATENT DOCUMENTS 5,675,326 A 10/1997 Juds et al.
6,259,815 B1 7/2001 Anderson et al.
(Continued)

FOREIGN PATENT DOCUMENTS

EP 1308902 A2 5/2003
KR 10-1054736 B1 8/2011
(Continued)

OTHER PUBLICATIONS

Muratov, Oleg, Yury Slynko, Vitaly Chernov, Maria Lyubimtseva, Artem Shamsuarov, and Victor Bucha. "3DCapture: 3D Reconstruction fora Smartphone." In Proceedings of the IEEE Conference on Computer Vision and Pattern Recognition Workshops, pp. 75-82. 2016. (Year: 2016).*
(Continued)

*Primary Examiner* — Carol Wang
(74) *Attorney, Agent, or Firm* — Proskauer Rose LLP

(57) ABSTRACT

Described herein are methods and systems for keyframe-based object scanning and tracking. A sensor device captures images of objects in a scene. For each image, a computing device labels each of at least a plurality of pixels in the image, tracks at least one region of the labeled image to determine an estimate of a current pose of at least one object, validates the estimate of the current pose of the at least one object, selects the labeled image as a keyframe based upon validation of the estimate of the current pose, and updates a volumetric model comprising the at least one object using the keyframe. The computing device generates a final 3D model of the at least one object based upon the updated volumetric model.

24 Claims, 11 Drawing Sheets

(51) Int. Cl.
*G06K 9/62* (2006.01)
*G06N 20/00* (2019.01)
*G06N 3/08* (2006.01)
*G06T 17/20* (2006.01)

(52) U.S. Cl.
CPC .............. *G06N 20/00* (2019.01); *G06T 7/73* (2017.01); *G06T 17/20* (2013.01)

(58) Field of Classification Search
CPC .......... G06N 3/08; G06N 7/005; G06T 17/20; G06T 7/73; G06T 2207/20081
See application file for complete search history.

(56) References Cited

U.S. PATENT DOCUMENTS

| | | | |
|---|---|---|---|
| 6,275,235 | B1 | 8/2001 | Morgan, III |
| 6,525,722 | B1 | 2/2003 | Deering |
| 6,525,725 | B1 | 2/2003 | Deering |
| 7,248,257 | B2 | 7/2007 | Elber |
| 7,420,555 | B1 | 9/2008 | Lee |
| 7,657,081 | B2 | 2/2010 | Blais et al. |
| 8,209,144 | B1 | 6/2012 | Anguelov et al. |
| 8,542,233 | B2 | 9/2013 | Brown |
| 8,766,979 | B2 | 7/2014 | Lee et al. |
| 8,942,917 | B2 | 1/2015 | Chrysanthakopoulos |
| 8,995,756 | B2 | 3/2015 | Lee et al. |
| 9,041,711 | B1 | 5/2015 | Hsu |
| 9,104,908 | B1 | 8/2015 | Rogers et al. |
| 9,171,402 | B1 | 10/2015 | Allen et al. |
| 9,607,388 | B2 | 5/2017 | Lin et al. |
| 9,710,960 | B2 | 7/2017 | Hou |
| 9,886,530 | B2 | 2/2018 | Mehr et al. |
| 9,978,177 | B2 | 5/2018 | Mehr et al. |
| 2005/0068317 | A1 | 3/2005 | Amakai |
| 2005/0128201 | A1 | 6/2005 | Warner et al. |
| 2005/0253924 | A1 | 11/2005 | Mashitani |
| 2006/0050952 | A1 | 3/2006 | Blais et al. |
| 2006/0170695 | A1 | 8/2006 | Zhou et al. |
| 2006/0277454 | A1 | 12/2006 | Chen |
| 2007/0075997 | A1 | 4/2007 | Rohaly et al. |
| 2007/0122001 | A1* | 5/2007 | Wang ................ G06K 9/00208 382/103 |
| 2007/0216675 | A1* | 9/2007 | Sun ........................ G06T 11/00 345/419 |
| 2008/0180448 | A1 | 7/2008 | Anguelov et al. |
| 2008/0181486 | A1* | 7/2008 | Spooner .................... G06T 7/55 382/154 |
| 2008/0310757 | A1 | 12/2008 | Wolberg et al. |
| 2009/0232353 | A1 | 9/2009 | Sundaresan et al. |
| 2010/0111370 | A1 | 5/2010 | Black et al. |
| 2010/0198563 | A1 | 8/2010 | Plewe |
| 2010/0209013 | A1 | 8/2010 | Minear et al. |
| 2010/0302247 | A1 | 12/2010 | Perez et al. |
| 2011/0052043 | A1 | 3/2011 | Hyung et al. |
| 2011/0063403 | A1* | 3/2011 | Zhang ...................... G06T 7/75 348/14.1 |
| 2011/0074929 | A1 | 3/2011 | Hebert et al. |
| 2012/0056800 | A1 | 3/2012 | Williams et al. |
| 2012/0063672 | A1 | 3/2012 | Gordon et al. |
| 2012/0098937 | A1 | 4/2012 | Sajadi et al. |
| 2012/0130762 | A1 | 5/2012 | Gale et al. |
| 2012/0194516 | A1 | 8/2012 | Newcombe et al. |
| 2012/0194517 | A1 | 8/2012 | Izadi et al. |
| 2012/0306876 | A1 | 12/2012 | Shotton et al. |
| 2013/0069940 | A1 | 3/2013 | Sun et al. |
| 2013/0123801 | A1 | 5/2013 | Umasuthan et al. |
| 2013/0156262 | A1 | 6/2013 | Taguchi et al. |
| 2013/0201104 | A1 | 8/2013 | Ptucha et al. |
| 2013/0201105 | A1 | 8/2013 | Ptucha et al. |
| 2013/0208955 | A1 | 8/2013 | Zhao et al. |
| 2014/0160115 | A1 | 6/2014 | Keitler et al. |
| 2014/0176677 | A1 | 6/2014 | Valkenburg et al. |
| 2014/0206443 | A1 | 7/2014 | Sharp et al. |
| 2014/0240464 | A1 | 8/2014 | Lee |
| 2014/0241617 | A1 | 8/2014 | Shotton et al. |
| 2014/0270484 | A1 | 9/2014 | Chandraker et al. |
| 2014/0321702 | A1 | 10/2014 | Schmalstieg |
| 2015/0009214 | A1 | 1/2015 | Lee et al. |
| 2015/0045923 | A1 | 2/2015 | Chang et al. |
| 2015/0142394 | A1 | 5/2015 | Mehr et al. |
| 2015/0213572 | A1 | 7/2015 | Loss |
| 2015/0234477 | A1 | 8/2015 | Abovitz et al. |
| 2015/0262405 | A1 | 9/2015 | Black et al. |
| 2015/0269715 | A1 | 9/2015 | Jeong et al. |
| 2015/0279118 | A1 | 10/2015 | Dou et al. |
| 2015/0301592 | A1 | 10/2015 | Miller |
| 2015/0325044 | A1 | 11/2015 | Lebovitz |
| 2015/0371440 | A1 | 12/2015 | Pirchheim et al. |
| 2016/0026253 | A1 | 1/2016 | Bradski et al. |
| 2016/0071318 | A1 | 3/2016 | Lee et al. |
| 2016/0163098 | A1* | 6/2016 | Blanchflower ........... G06T 7/55 345/419 |
| 2016/0171765 | A1 | 6/2016 | Mehr |
| 2016/0173842 | A1 | 6/2016 | De La Cruz et al. |
| 2016/0358382 | A1 | 12/2016 | Lee et al. |
| 2017/0053447 | A1 | 2/2017 | Chen et al. |
| 2017/0054954 | A1 | 2/2017 | Keitler et al. |
| 2017/0054965 | A1 | 2/2017 | Raab et al. |
| 2017/0221263 | A1 | 8/2017 | Wei et al. |
| 2017/0243397 | A1 | 8/2017 | Hou et al. |
| 2017/0249752 | A1* | 8/2017 | Kotake ..................... G06T 7/73 |
| 2017/0278293 | A1 | 9/2017 | Hsu |
| 2017/0316597 | A1 | 11/2017 | Ceylan et al. |
| 2017/0316612 | A1* | 11/2017 | Moteki ..................... G06T 7/73 |
| 2017/0337726 | A1 | 11/2017 | Bui et al. |
| 2018/0005015 | A1* | 1/2018 | Hou .................. G06K 9/00201 |
| 2018/0025529 | A1 | 1/2018 | Wu et al. |
| 2018/0114363 | A1 | 4/2018 | Rosenbaum |
| 2018/0144535 | A1 | 5/2018 | Ford et al. |
| 2018/0218513 | A1* | 8/2018 | Ho ............................ G06T 7/73 |
| 2018/0288387 | A1 | 10/2018 | Somanath et al. |
| 2018/0300937 | A1 | 10/2018 | Chien et al. |
| 2019/0026942 | A1* | 1/2019 | Zhang .................... G06T 7/251 |
| 2019/0073787 | A1 | 3/2019 | Lee et al. |
| 2019/0073825 | A1 | 3/2019 | Lee et al. |
| 2019/0206116 | A1* | 7/2019 | Xu ........................... G06T 7/579 |
| 2019/0208007 | A1 | 7/2019 | Khalid |
| 2019/0213773 | A1 | 7/2019 | Lee et al. |
| 2019/0220775 | A1* | 7/2019 | Suzuki ..................... G05D 1/04 |
| 2019/0226852 | A1* | 7/2019 | Xie ......................... G01C 21/165 |
| 2019/0234746 | A1* | 8/2019 | Zhang ..................... G01C 21/16 |
| 2019/0244412 | A1 | 8/2019 | Yago Vicente et al. |
| 2019/0304161 | A1 | 10/2019 | Yin et al. |
| 2020/0086487 | A1 | 3/2020 | Johnson et al. |
| 2020/0105013 | A1 | 4/2020 | Chen |
| 2020/0334842 | A1* | 10/2020 | Michielin ............... G06T 15/10 |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
Melax, S., "A Simple, Fast, and Effective Polygon Reduction Algorithm," Game Developer, Nov. 1998, pp. 14-49.
Myronenko, A. et al., "Point Set Registration: Coherent Point Drift," IEEE Transactions on Pattern Analysis and Machine Intelligence, vol. 32, No. 12, Dec. 2010, pp. 2262-2275.
Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.
Izadi, S. et al., "KinectFusion: Real-time 3D Reconstruction and Interaction Using a Moving Depth Camera," UIST '11, Oct. 16-19, 2011, 10 pages.
Papazov, C et al., "An Efficient RANSAC for 3D Object Recognition in Noisy and Occluded Scenes," presented at Computer Vision—

(56) References Cited

OTHER PUBLICATIONS

ACCV 2010 -10th Asian Conference on Computer Vision, Queenstown, New Zealand, Nov. 3-12, 2010, 14 pages.
Biegelbauer, Georg et al., "Model-based 3D object detection - Efficient approach using superquadrics," Machine Vision and Applications, Jun. 2010, vol. 21, Issue 4, pp. 497-516.
Kanezaki, Asako et al., "High-speed 3D Object Recognition Using Additive Features in a Linear Subspace," 2010 EEE International Conference on Robotics and Automation, Anchorage Convention District, May 3-8, 2010, pp. 3128-3134.
International Search Report and Written Opinion from PCT patent application No. PCT/US13/062292, dated Jan. 28, 2014,10 pages.
International Search Report and Written Opinion from PCT patent application No. PCT/US14/045591, dated Nov. 5, 2014, 9 pages.
Sumner, R. et al., "Embedded Deformation for Shape Manipulation," Applied Geometry Group, ETH Zurich, SIGGRAPH 2007, 7 pages.
Rosten, Edward, et al., "Faster and better: a machine learning approach to corner detection," arXiv:08102.2434v1 cs.CV], Oct. 14, 2008, available at https://arxiv.org/pdf/0810.2434.pdf, 35 pages.
Kim, Young Min, et al., "Guided Real-Time Scanning of Indoor Objects," Computer Graphics Forum, vol. 32, No. 7 (2013), 10 pages.
Rusinkewicz, Szymon, et al., "Real-time 3D model acquisition," ACM Transactions on Graphics (TOG) 21.3 (2002), pp. 438-446.
European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.
Stoll, C., et al., "Template Deformation for Point Cloud Filtering," Eurographics Symposium on Point-Based Graphics (2006), 9 pages.
Allen, Brett, et al., "The space of human body shapes: reconstruction and parameterization from range scans," ACM Transactions on Graphics (TOG), vol. 22, Issue 3, Jul. 2003, pp. 587-594.
International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. [1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sept 7, 2008, 14 pages.
Kummerle, Rainer, et al., "g2o: A General Framework for Graph Optimization," 2011 IEEE International Conference an Robotics and Automation, May 9-13, 2011, Shanghai, China, 7 pages.

\* cited by examiner

KEYFRAME-BASED OBJECT SCANNING AND TRACKING

RELATED APPLICATIONS

This application claims priority to U.S. Provisional Patent Application No. 62/676,507, filed May 25, 2018, and U.S. Provisional Patent Application No. 62/789,309, filed Jan. 7, 2019, each of which are incorporated herein by reference.

TECHNICAL FIELD

This subject matter of this application relates generally to methods and apparatuses, including computer program products, for keyframe-based object scanning and tracking—including techniques for improved computer vision tracking using machine learning.

BACKGROUND

Generally, some current techniques for performing unified tracking of an object in a 3D scene are based on using a 2D keyframe and a raycast point cloud derived from the global model. An example of this type of technique is described in U.S. patent application Publication Ser. No. 16/123,256, titled "Combining Sparse Two-Dimensional (2D) and Dense Three-Dimensional (3D) Tracking."

This technique works well when using a high-quality structured light sensor, which can provide an accurate depth map and which, in turn, provides an accurate pose result. However, when using a sensor that is not as accurate, such as a back-illuminated time-of-flight (ToF) image sensor from Sony Corp., for example, the pose calculation tends to be less accurate resulting in drifting of the tracking as the object is rotated over 360 degrees. This drifting then in turn causes significant problems at the loop-end of the object—as well as in the quality of the 3D global model.

In addition, one of the problems in using dynamic capture in traditional computer vision/object tracking platforms is that there are certain conditions in which the pose computation is not accurate. This results from the fact that there is no single tracking algorithm that works for all possible sets of 2D+3D features used in tracking. When this error occurs, it could cause deformation of the 3D model due to having a wrong pose—which means that the entire scanning process has to be repeated from the start. Therefore, it is important to detect when such condition occurs such that the 3D model is not updated with the latest incoming depth map image until the pose is correct again. Hence, what is needed is a quality check module that can accurately detect the condition of an incorrect pose.

There are two areas in tracking where this 'false positive pose' (also known as 'drifting check') can help. First, during scanning while the object is being tracked, if such erroneous condition is detected, the system can stop the mapping process. Second, if tracking is lost completely, the system can validate the re-localization of the object. In either case, a reliable detection of such conditions is very important.

In traditional implementations, a set of criteria with adjustable parameters is used to detect the condition of an incorrect pose. However, it is very difficult to properly come up with a set of conditions and parameters that are reliable over a very large number of different types of objects with different sets of features. The process is very time consuming with results not being as reliable as needed.

SUMMARY

Therefore, what is needed are methods and systems that overcome the technical challenges generated by less-accurate ToF sensors to provide accurate and robust object tracking when using such sensors. The techniques described herein advantageously provide keyframe-based tracking—even for dense tracking—based on the depth map. Hence, as described herein, the tracking relies on the local depth map and 2D keyframes—as opposed to the 3D global model. It also allows for a real-time correction of the 3D global model based on the truncated signed distance function (TSDF).

Also, the techniques described herein advantageously apply machine learning techniques to the incorrect pose problem described above, using a set of key criteria along with a large training dataset. This approach thus provides a validation process which verifies that the estimated pose is accurate. As described herein, the algorithm utilizes current color and depth maps, current feature points, reference keyframes, and model raycast data to inform the validation.

The main idea of validation is the same whether the system is using it to verify re-localization or using it as a drifting check during the scanning to detect 'false positive' conditions where the pose is inaccurate. The central difference is that false negatives (i.e., when the pose is correct, but the system assigns the pose as being incorrect) have a larger impact during scanning, potentially causing too many tracking losses. Hence, during tracking, the system advantageously leverages the machine learning techniques to both detect false positives and minimize the false negative rate.

The invention, in one aspect, features a system for keyframe-based object scanning and tracking. The system comprises a sensor device that captures a plurality of images of one or more objects in a scene, and a computing device coupled to the sensor device that comprises a memory that stores computer-executable instructions and a processor that executes the instructions. For each image of the plurality of images, the computing device labels each of at least a plurality of pixels in the image as either a background pixel, a foreground noise pixel, an object pixel, or an unknown pixel; tracks at least one region of the labeled image to determine an estimate of a current pose of at least one of the one or more objects, wherein the at least one region is determined by the labeled pixels; validates the estimate of the current pose of the at least one of the one or more objects; selects the labeled image as a keyframe based upon validation of the estimate of the current pose of the at least one of the one or more objects; and updates a volumetric model comprising the at least one of the one or more objects using the keyframe. The computing device generates a final 3D model of the at least one of the one or more objects based upon the updated volumetric model.

The invention, in another aspect, features a computerized method of keyframe-based object scanning and tracking. A sensor device captures a plurality of images of one or more objects in a scene. For each image of the plurality of images, a computing device coupled to the sensor device labels each of at least a plurality of pixels in the image as either a background pixel, a foreground noise pixel, an object pixel, or an unknown pixel; tracks at least one region of the labeled image to determine an estimate of a current pose of at least one of the one or more objects, wherein the at least one region is determined by the labeled pixels; validates the estimate of the current pose of the at least one of the one or more objects; selects the labeled image as a keyframe based upon validation of the estimate of the current pose of the at least one of the one or more objects; and updates a volumetric model comprising the at least one of the one or more objects using the keyframe. The computing device generates a final 3D model of the at least one of the one or more objects based upon the updated volumetric model.

Any of the above aspects can include one or more of the following features. In some embodiments, tracking at least one region of the labeled image comprises: rendering an anchor depth map based upon an implicit surface of the at least one of the one or more objects, the implicit surface defined by a Truncated Signed Distance Function (TSDF); identifying one or more reference keyframes based upon the labeled image; defining first error terms between the labeled image and the anchor depth map using Iterative Closest Point (ICP); defining second error terms between the labeled image and the one or more reference keyframes based upon matching features; and minimizing the first error terms and the second error terms to determine the estimate of the current pose of the at least one of the one or more objects.

In some embodiments, validating the estimate of the current pose of the at least one of the one or more objects comprises comparing the estimate of the current pose of the at least one of the one or more objects to a pose of the at least one of the one or more objects in one of the one or more reference keyframes. In some embodiments, validating the estimate of the current pose of the at least one of the one or more objects comprises: generating a feature set using a depth map associated with the labeled image, the anchor depth map, the estimate of the current pose of the at least one of the one or more objects, one or more ORB features of the at least one of the one or more objects, and one or more of the reference keyframes, wherein the feature set comprises a dense error value and a sparse error value; generating a feature vector from the feature set; and executing a machine learning classifier on the feature vector to classify the feature vector as corresponding to a correct object pose or an incorrect object pose.

In some embodiments, the machine learning classifier is trained on training data to predict whether an input feature vector corresponds to a correct object pose. In some embodiments, the machine learning classifier includes a bias value to adjust a classification outcome of the classifier.

In some embodiments, selecting the image as a keyframe based upon validation of the estimate of the current pose of the at least one of the one or more objects comprises: identifying one or more of: a strength of color features in the labeled image, a confidence of the estimate of the current pose, or a presence of foreground noise in the labeled image; and selecting the labeled image as a keyframe based upon the identified strength of color features in the labeled image, the confidence of the estimate of the current pose, or the presence of foreground noise in the labeled image. In some embodiments, the computing device evaluates one or more reference keyframes related to the labeled image to determine whether one or more of the reference keyframes are redundant. In some embodiments, the computing device removes one or more redundant reference keyframes.

In some embodiments, updating a volumetric model comprising the at least one of the one or more objects using the keyframe comprises one or more of: adding the keyframe to the volumetric model; or removing the keyframe from the volumetric model. In some embodiments, adding the keyframe to the volumetric model comprises: determining a distance from each cell in a surface of the at least one of the one or more objects in the volumetric model to a surface of the at least one of the one or more objects in the keyframe; and averaging the determined distance into the volumetric model. In some embodiments, removing the keyframe from the volumetric model comprises subtracting the determined distance from the volumetric model.

In some embodiments, the computing device generates an initial volumetric model of the at least one of the one or more objects, searches for a registration between the initial volumetric model and the updated volumetric model, and merges the initial volumetric model with the updated volumetric model when a registration is found.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
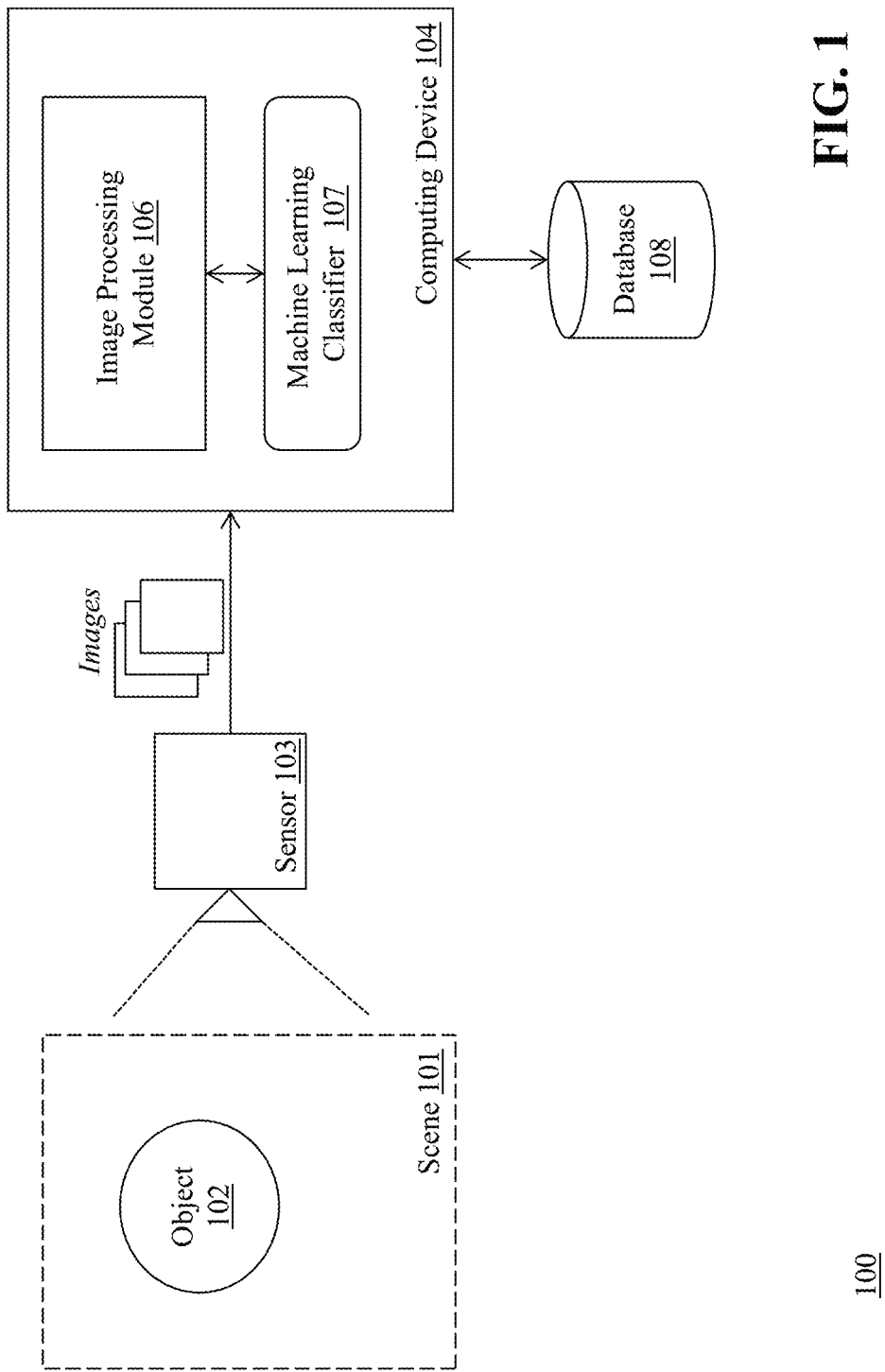
FIG. 1 is a block diagram of a system for keyframe-based object scanning and tracking.

FIG. 1 is a block diagram of a system 100 for keyframe-based object scanning and tracking. Certain embodiments of the systems and methods described in this application utilize:

- the object recognition, reconstruction, and analysis techniques as described in U.S. Pat. No. 9,715,761, titled "Real-Time 3D Computer Vision Processing Engine for Object Recognition, Reconstruction, and Analysis;"
- the dynamic 3D modeling techniques as described in U.S. patent application Ser. No. 14/849,172, titled "Real-Time Dynamic Three-Dimensional Adaptive Object Recognition and Model Reconstruction;"
- the shape-based registration and modeling techniques described in U.S. Pat. No. 10,169,676, titled "Shape-Based Registration for Non-Rigid Objects with Large Holes;"
- the 3D photogrammetry techniques described in U.S. Pat. No. 10,192,347, titled "3D Photogrammetry;"
- the sparse SLAM and unified tracking techniques as described in U.S. patent application Ser. No. 15/638,278, titled "Sparse Simultaneous Localization and Matching with Unified Tracking;"
- the 2D and 3D video compression techniques described in U.S. patent application Ser. No. 15/726,316, titled "Real-Time Remote Collaboration and Virtual Presence using Simultaneous Localization and Mapping to Construct a 3D Model and Update a Scene Based on Sparse Data;"

the object tracking techniques as described in U.S. patent application Ser. No. 16/123,256, titled "Combining Sparse Two-Dimensional (2D) and Dense Three-Dimensional (3D) Tracking;"

the 4D hologram technology described in U.S. patent application Ser. No. 16/240,404, titled "4D Hologram: Real-Time Remote Avatar Creation and Animation Control;"

the real-time texture alignment techniques described in U.S. patent application Ser. No. 16/374,023, titled "Dynamic Real-Time Texture Alignment for 3D Models;"

the 3D capture techniques described in U.S. Provisional Patent Application No. 62/843,680, titled "3D Capture Using Edge Cloud Computing Resources;" and the remote 3D animation techniques described in U.S. Provisional Patent Application No. 62/843,683, titled "Remote Visualization of 3D Animation With Synchronized Voice in Time."

Each of the above-referenced patents and patent applications is incorporated by reference herein in its entirety. The methods and systems described in the above patents and patent applications, and in the present patent application, are available by implementing the Starry Night SDK, available from VanGogh Imaging, Inc. of McLean, Va.

The system includes a sensor 103 coupled to a computing device 104. The computing device 104 includes an image processing module 106. In some embodiments, the computing device can also be coupled to a data storage module 108, e.g., used for storing certain 3D models, color images, and other data as described herein. The sensor 103 is positioned to capture images (e.g., color images) of a scene 101 which includes one or more physical objects (e.g., object 102). In some embodiments, a user manually rotates and moves the object 102 in the scene 101 so that the sensor 103 captures a plurality of scans of the object from different angles and/or sides; in some embodiments, the user's hand is captured in the scans along with the object.

Exemplary sensors that can be used in the system 100 include, but are not limited to, time-of-flight (ToF) sensors that are capable of capturing depth information of the pixels along with the images of a real-world object and/or scene to collect data on its position, location, and appearance. Other types of sensors include 3D scanners, digital cameras, and other types of devices. In some embodiments, the sensor 103 is embedded into the computing device 104, such as a camera in a smartphone, for example. An exemplary sensor 103 can be a 3D scanner built from combining a depth camera and a high-resolution RGB camera. The cameras can be calibrated so their data can be registered to each other. In one embodiment, the sensor 103 includes an Orbbec Astra Mini depth camera attached to, e.g., a mobile device with an embedded camera. It should be appreciated that other combinations of these devices or other devices can be used to perform the techniques described herein.

The computing device 104 receives images (also called scans) of the scene 101 from the sensor 103 and processes the images to generate 3D models of objects (e.g., object 102) represented in the scene 101. The computing device 104 can take on many forms, including both mobile and non-mobile forms. Exemplary computing devices include, but are not limited to, a laptop computer, a desktop computer, a tablet computer, a smartphone, a smart watch, an internet of things (IoT) device, augmented reality (AR)/virtual reality (VR) devices (e.g., glasses, headset apparatuses, and so forth), or the like. In some embodiments, the sensor 103 and computing device 104 can be embedded in a larger mobile structure such as a robot or unmanned aerial vehicle (UAV). It should be appreciated that other computing devices can be used without departing from the scope of the invention. The computing device 104 includes network-interface components to connect to a communications network (not shown). In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 is a hardware and/or software module that resides on the computing device 104 to perform functions associated with analyzing images capture by the scanner, including the generation of 3D models (e.g., .OBJ files) based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from VanGogh Imaging, Inc. of McLean, Va.

It should be appreciated that in one embodiment, the image processing module 106 comprises specialized hardware (such as a processor or system-on-chip) that is embedded into, e.g., a circuit board or other similar component of another device. In this embodiment, the image processing module 106 is specifically programmed with the image processing and modeling software functionality described below.

In some embodiments, the computing device 104 includes a machine learning classifier 107, which is a specialized hardware and/or software module that can be trained with a set of object tracking training data to generate a classification model that automatically validates tracking (i.e., pose information) associated with one or more objects in the scene—as will be described in greater detail below.

The keyframe-based object reconstruction process described herein uses a model that is defined by a set of keyframes. In order to speed up processing, a volumetric model is rebuilt from the keyframe set every time a keyframe is inserted or removed. Keyframes consist of a color image, a depth image aligned to the color image, an estimated pose, and a labeling of all locations in the images into semantic categories. The volumetric model contains a truncated signed distance field (TSDF) and a probabilistic space labeling. The TSDF is generated by projecting each depth image into the model space based on its pose and describes the implicit surface of the object being scanned. The space labeling is created by analyzing the labels associated with the depth image and is used to classify points in future frames.

As will be described below, the scanning system is composed of a tracking and a mapping subsystem. During scanning, the location of the object is tracked against a model, which is built from select input frames. In the event of tracking loss, the system restarts construction at the new location while simultaneously trying to align the new map to the original. The system tracks each frame individually in sequence. Upon receiving a new frame of data, the system first attempts to label regions of the image that correspond to the desired object, unwanted foreground noise, and the background behind the object. The system then attempts to align the object portion of the input by aligning it with a combination of model parameters via several error terms. The first set of terms comes from the input 3D point cloud and an anchor point cloud rendered from the TSDF at the last estimated pose. Further terms are supplied by corner, edge, and 3d features in the keyframes close to the current frame.

Figure 2:
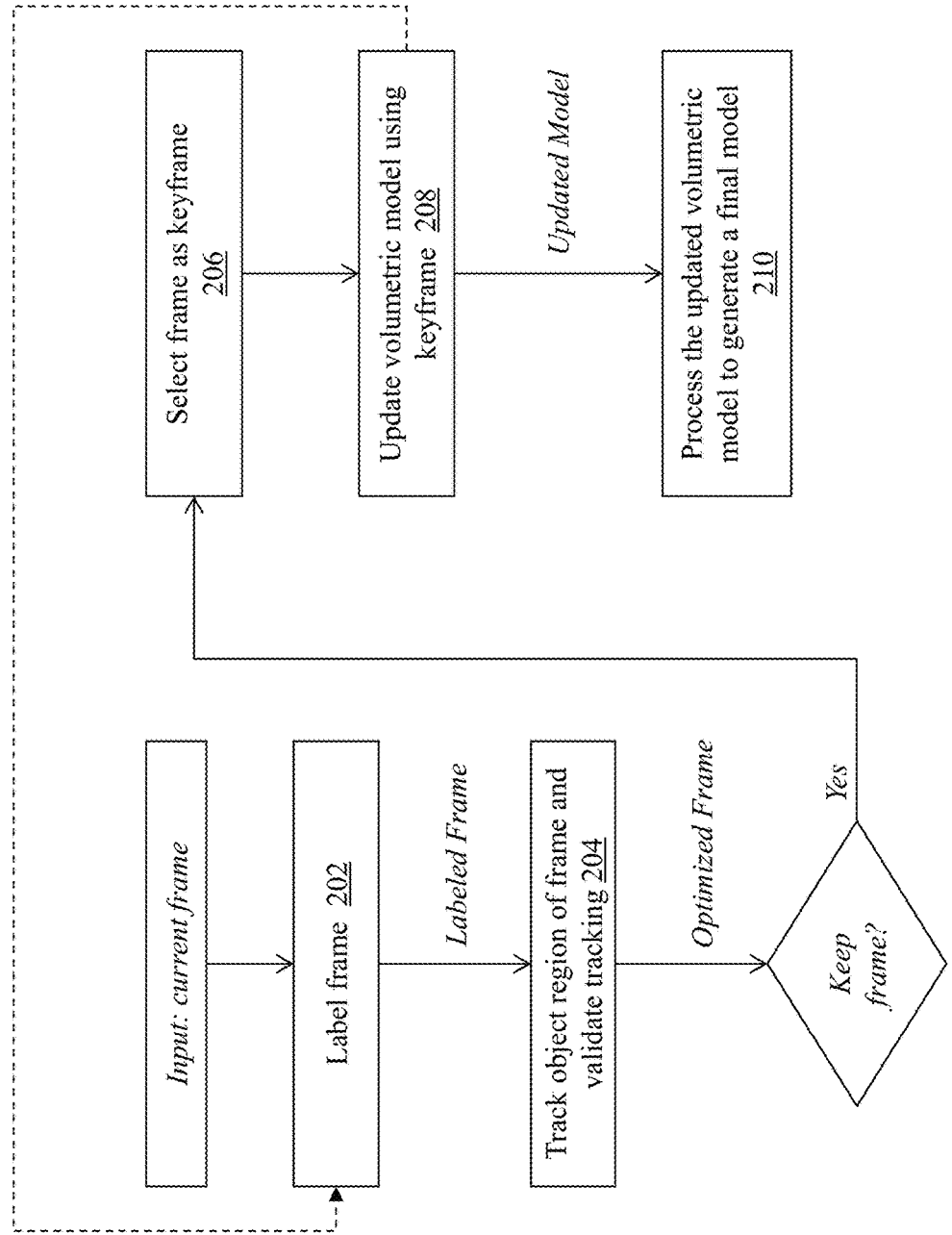
FIG. 2 is a flow diagram of a computerized method of keyframe-based object scanning and tracking.

FIG. 2 is a flow diagram of a computerized method 200 of keyframe-based object scanning and tracking, using the system 100 of FIG. 1. The sensor 103 captures one or more scans (also called frames or images) of the object 102 in the scene, and transmits a depth map and a color image for each scan to the image processing module 106, for use as input to object tracking and model generation process.

The image processing module 106 labels (202) the input frame. In the labeling process, each pixel in the depth image of each keyframe is labeled as either background, foreground noise, object, or unknown. Generally, background pixels are those which must be behind the object. They imply there is no part of the object along the ray associated with that pixel. Object pixels are those depth points corresponding to the object that the system is trying to track and reconstruct. Foreground noise pixels are any points around the object that the system does not wish to track, including the user's hands or clutter in the environment. Parts of the object may be behind the foreground noise point. Unknown pixels are those that cannot be accurately categorized or do not have any depth data. In some embodiments, the image processing module 106 generates label data (e.g., a mapping file that defines the pixel labels in conjunction with the depth/image data) and stores the generated label data in database 108. Labels are generated by examining each pixel's geometric relationship to the total scene geometry for that frame and the estimated model location. For instance, the image processing module 106 labels a group of points close to the camera surrounded by distant points as an object, while a point that is part of a large plane of points is probably part of the table on which the user is scanning, and the image processing module 106 labels the point as background.

Figure 3:
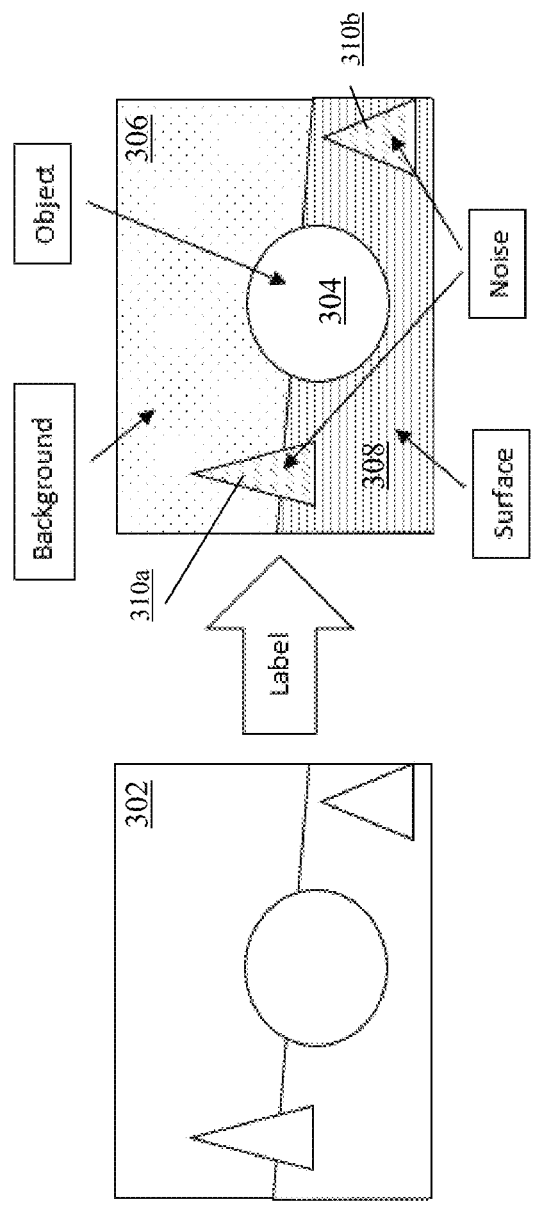
FIG. 3 is a diagram showing how the system labels portions of a keyframe.

FIG. 3 is a diagram showing how the system 100 labels portions of the keyframe. As shown in FIG. 3, the image processing module 106 receives an input keyframe 302, and labels the sphere 304 in the middle of the keyframe as 'object,' labels a portion 306 of the keyframe as 'background,' labels another portion 308 of the keyframe as 'surface,' and labels certain regions 310a, 310b around the object as 'noise.'

Figure 7:
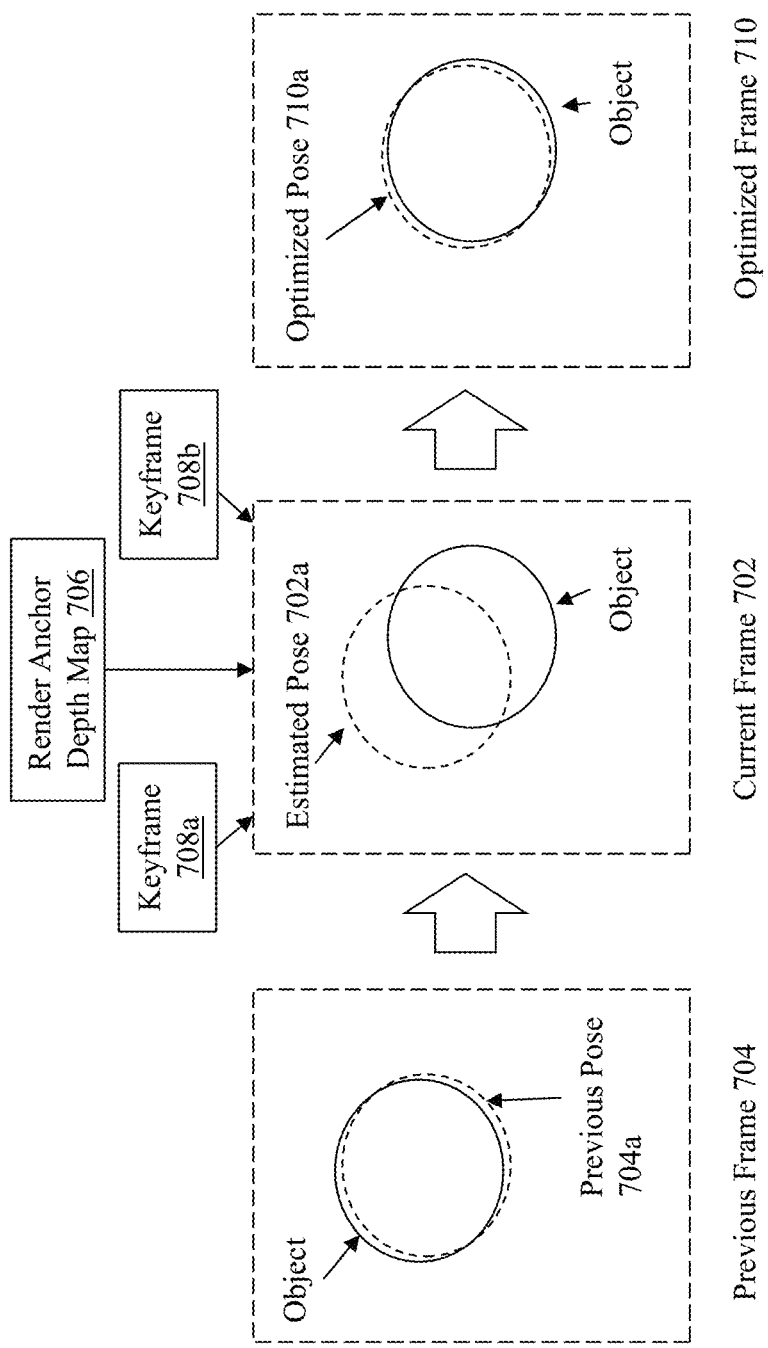
FIG. 7 is a workflow diagram of object region tracking.

Once the frame is labeled, the image processing module 106 tracks (204) a region (i.e., an object region) of the labeled frame. Using a keyframe-based model allows the image processing module 106 to track many different features than just the 3D surface. It also allows the module 106 to check surface reconstruction against ground truth to help detect error conditions. FIG. 7 is a workflow diagram of object region tracking, using the system 100 of FIG. 1.

As shown in FIG. 7, the current input frame 702 comprises a color and depth image, both already warped to a common alignment. The module 106 also has a rough estimate of the pose 702a of the object in the current input frame based on the optimized pose 704a of the previous frame 704. In order to optimize the current estimated pose, the module 106 renders an anchor depth map 706 based on the implicit surface defined by the TSDF as well as identifying several nearby reference keyframes (e.g., 708a, 708b). The module 106 defines error terms between the current frame 702 and the anchor map 706 using projection iterative closest point (ICP), and further error terms between the current frame 702 and the reference keyframes 708a, 708b based on matching corner and edge features. Minimizing these terms gives the module 106 an optimal estimate 710a for the current pose of the object (e.g., in an optimized frame 710).

The module 106 can then validate the tracking by comparing the current frame 702 to the individual keyframes 708a, 708b. A large error in several keyframes may indicate that tracking was not successful, while a large error in a single keyframe may mean that the keyframe pose is inaccurate and should be removed. As the module 106 continues to track the object(s), the module 106 accumulates statistics about the reference keyframes used and how accurate they are compared to other nearby keyframes. Low-quality keyframes can be removed and high accuracy input frames can be saved as keyframes. This way, tracking and model quality continues to improve throughout the tracking process.

In some embodiments, the image processing module 106 utilizes advanced algorithmic techniques described herein to train the machine learning classifier module 107 with a set of training data, then leverage the trained classifier 107 to automatically validate the tracking (e.g., the pose information). The module 106 can encapsulate indicator values into a fixed-size vector of real numbers and a machine learning classifier 107 is trained using a large number of examples of these vectors individually labeled "true" or "false." As a result, the classifier 107 solves the incorrect pose problem, allowing the image processing module 106 to automatically find the best transformation for every set of data in a short amount of time. As well, the training process produces hard numbers proving exactly how good a given approach is.

Data Requirements

In order to be confident in the output of training the machine learning classifier 107, the image processing module 106 must have a statistically meaningful set of data which covers more-or-less all situations that one is interested in handling. As well, the larger the feature vector, the more data is needed. For a three-element vector, two hundred samples may be sufficient. A ten-element vector may require several thousand. There should be a similar number of "true" and "false" samples.

Generally, in machine learning applications, data collection typically happens in rounds. An initial set of data is labeled and a classifier is trained. The classifier (e.g., machine learning classifier 107) can then be tested using more data. If the classifier 107 performs well, then the training phase is complete. If not, the module 106 can add the incorrectly classified data to the training set. This approach deliberately trains the classifier 107 on the cases it would otherwise get wrong.

Another way to estimate how much training data the module 106 needs by looking at the cross-validation results. If the training results (in terms of false positives and false negatives) are significantly better than the cross-validation results, then the classifier 107 is probably overfitting the data. The module 106 can then either reduce the size of the feature vector or add more data items How Regression Works The machine learning classifier 107 uses logistic regression to find the best separating hyperplane between the data. The classifier 107 starts by assigning "true" samples a value of 1 and "false" 0. Call this value $y_i$ for sample i. The module 106 wants to find θ that best approximates $\{x_i, y_i\}$ for all i via the function $$f(x; \theta) = \frac{1}{1 + e^{-\theta^T x}}.$$

The classifier 107 finds this value by running Newton's method on a cost function summing errors for each data sample. The classifier 107 then rounds the predicted f(x) to either 0 or 1 to classify any new data. Alternatively, the classifier 107 can simply test if the dot product of θ and x is greater or less than zero. This simple classification scheme has the advantage of being very fast, so it can be run every frame.

Extracting Features

Figure 4:
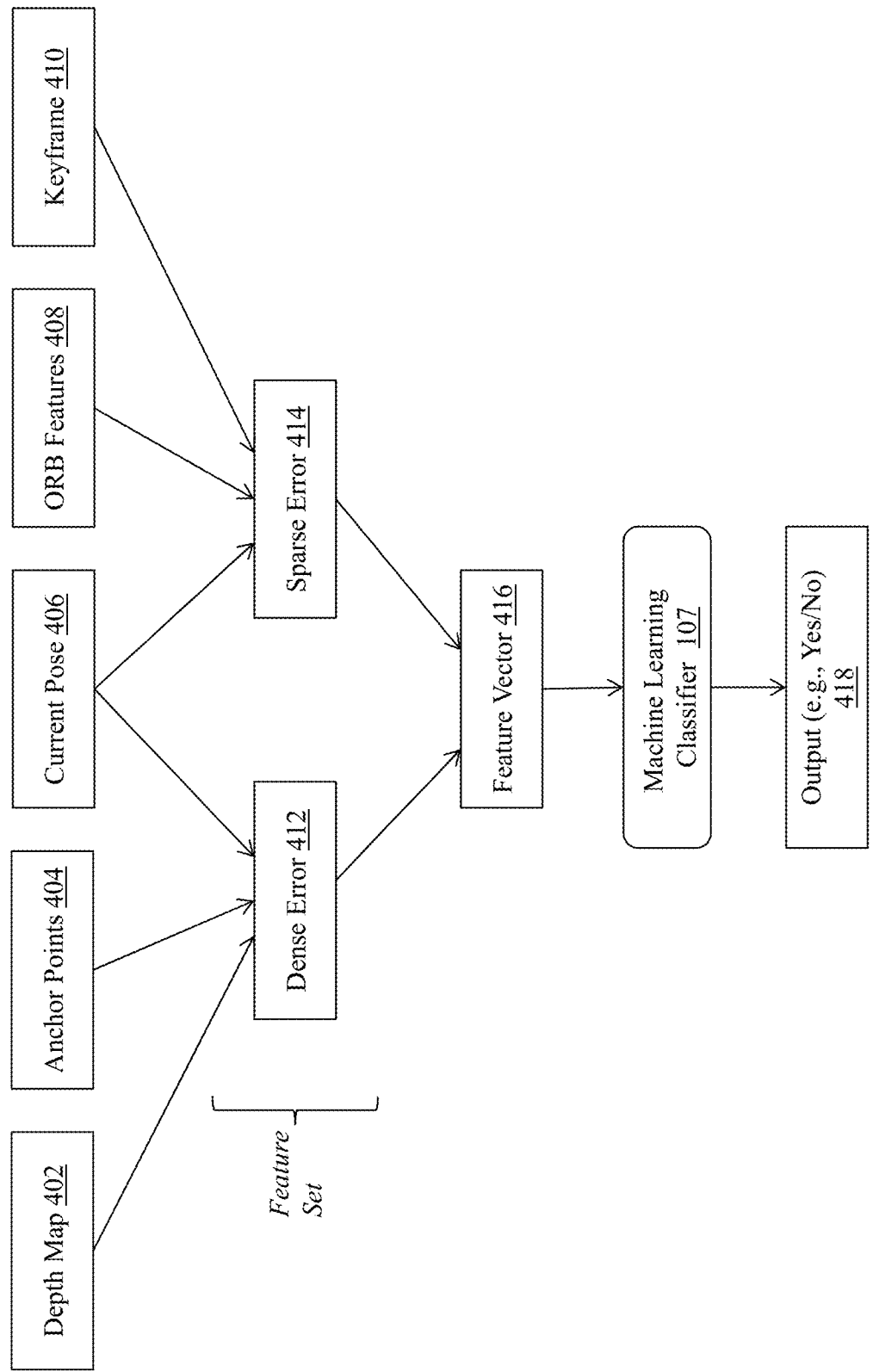
FIG. 4 is a flow diagram of a method for classifying pose information using machine learning.

FIG. 4 is a flow diagram of a method for classifying pose information using machine learning. As shown in FIG. 4, a feature set (i.e., a set of input parameters to be classified) is generated using certain input data created from one or more scans of the objects—depth map 402, anchor points 404, current pose 406, ORB features 408, keyframe 410. The feature set comprises three values: two values for dense error 412 and one value for sparse error 414. The two values in the dense error feature 412 are (i) the ratio of matched dense points to total points in the current model and (ii) the ratio of missing dense points to total points in the current 3D model. In this example, a matched point is a point where the input depth map 402 value is within some small distance of the expected 3D model point value (as determined from the current pose 406 and anchor points 404). A missing point is a point where the input depth map 402 value is much larger than the expected model point value, indicating that the image processing module 106 can see through where part of the 3D model is supposed to be if the pose was correct. The sparse error value 414 is a count of the number of 2D ORB features 408 that currently can be seen and which have a close match in the keyframe 410. It should be appreciated that the more matching ORB features, the more likely that the pose is correct. The image processing module 106 generates a feature vector 416 from the dense error 412 values and the sparse error 414 value, and transmits the feature vector to the machine learning classifier 107 as input. The classifier 107 executes to classify the vector as corresponding to an object pose that is correct (e.g., Yes) or incorrect (e.g., No) and generate associated output 418 for use by the module 106.

Figure 5:
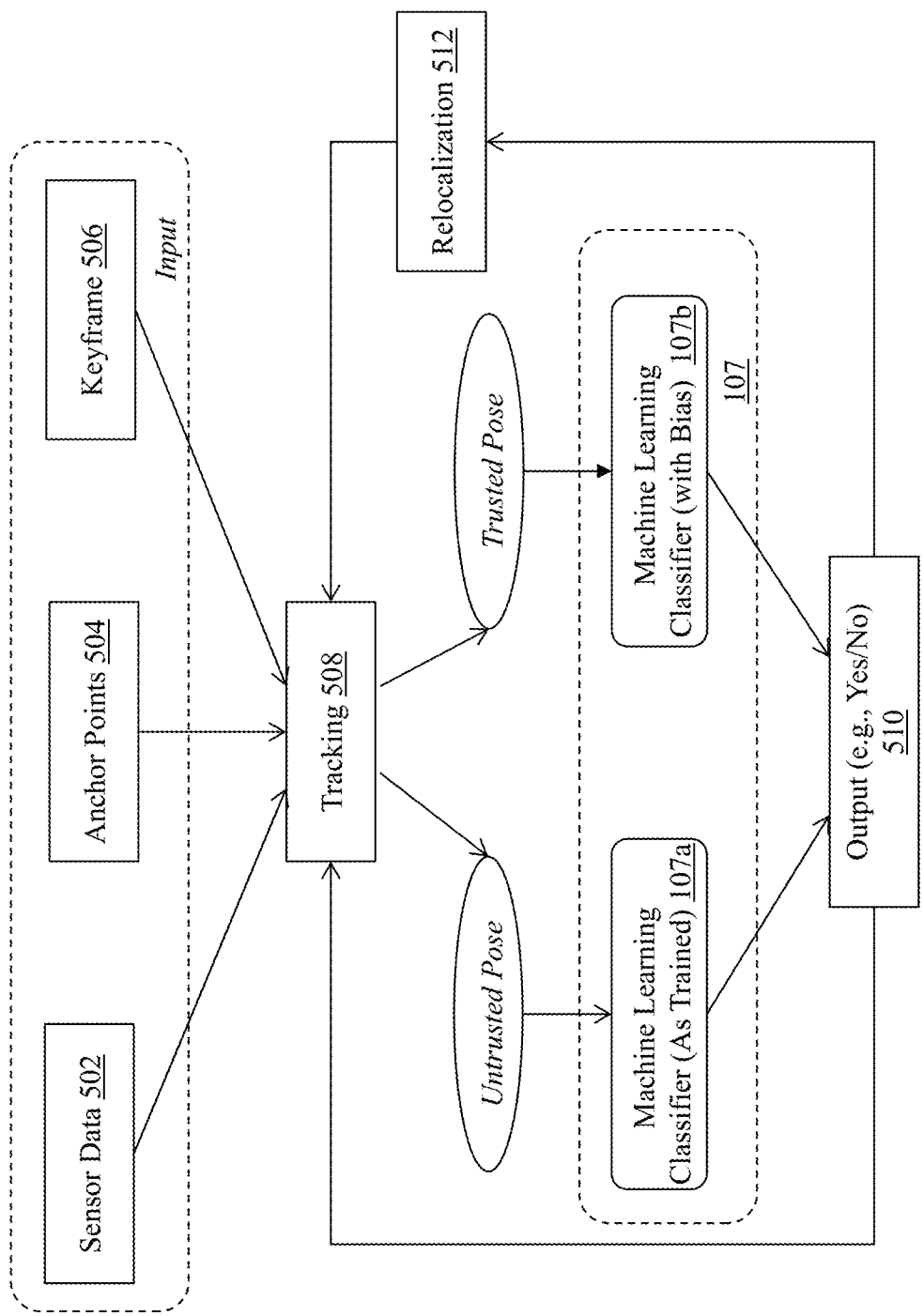
FIG. 5 is a flow diagram for classifying object pose information using machine learning.

FIG. 5 is a flow diagram for classifying object pose information using machine learning. As shown in FIG. 5, the classifier 107 can be used after tracking 508 every input frame, using the input sensor data 502, anchor point data 504, and keyframe data 506 (as described above). If the current pose is untrusted, such as when the image processing module 106 has recently re-localized (i.e., re-localization 512), the image processing module 106 uses the classifier 107a as trained. Once the current pose is trusted, the machine learning classifier 107b can include bias in the classification process (e.g., by lowering the passing threshold) to avoid having too many false positives. In this way, the classifier 107 acts as both a validator for re-localization and a drifting check during normal tracking. As above, the classifier 107a or the classifier with bias 107b executes to classify the vector as corresponding to an object pose that is correct (e.g., Yes) or incorrect (e.g., No) and generate associated output 510 for use by the image processing module 106.

Figure 8:
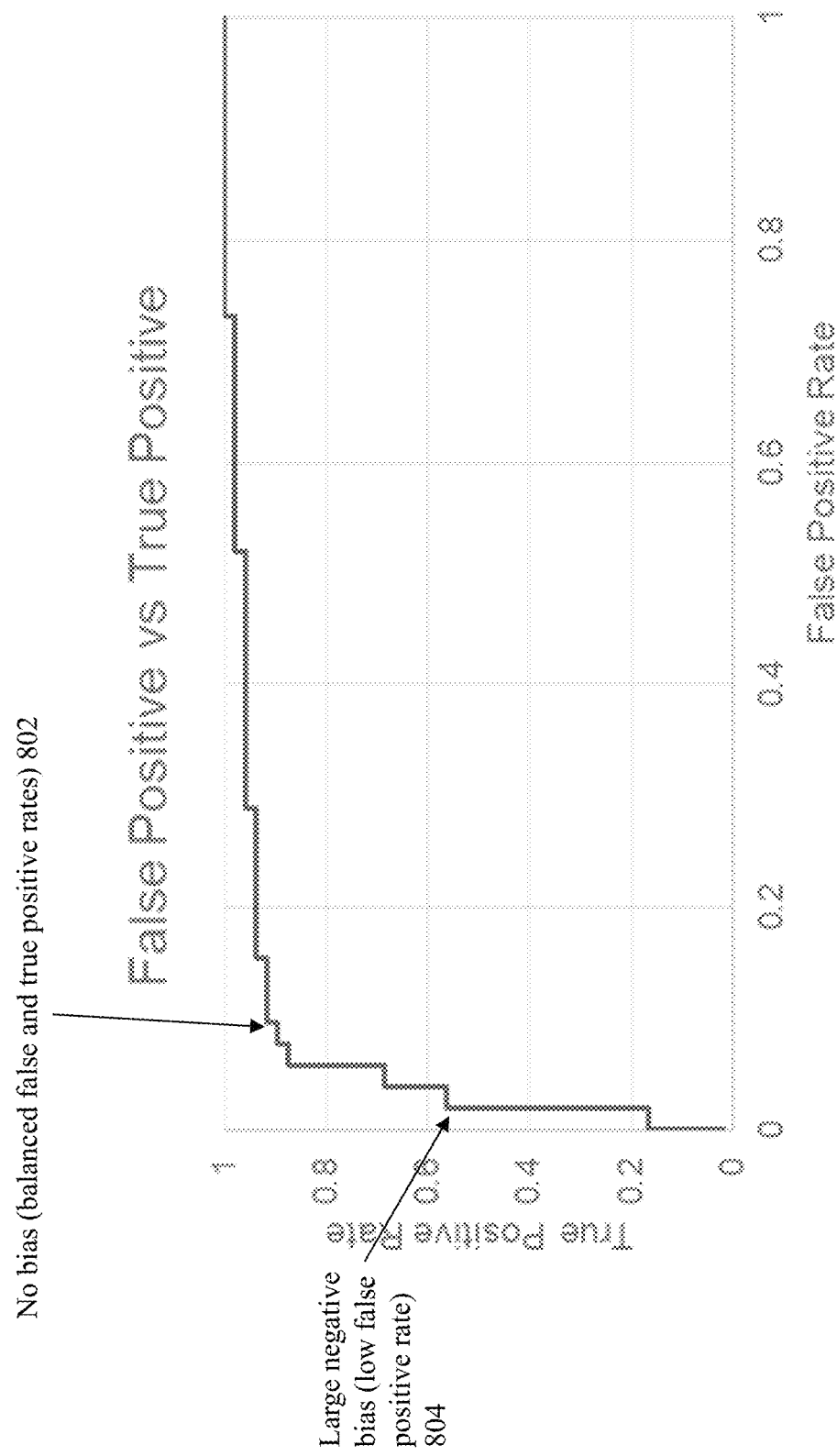
FIG. 8 is a graph showing the performance of an exemplary machine learning classifier that detects drift.

FIG. 8 is a graph showing the performance of an exemplary machine learning classifier (e.g., classifier 107) that detects drift. A positive result indicates that drifting has occurred. The graph of FIG. 8 shows the tradeoff between the true positive rate (TPR), i.e. how many drifted frames were correctly identified, versus the false positive rate (FPR), i.e. how many correctly aligned frames were misclassified as drifted. Different bias levels correspond to different points on the curve. The point 802 labeled "no bias" presents an optimal balance between TPR and FPR for a single frame and is used during re-localization. However, during tracking the system can consider many similar frames in succession, so a large negative bias can be chosen (point 804), lowering the FPR at the cost of the TPR.

Also, it should be appreciated that the machine learning techniques described herein can be used for any part of tracking where the image processing module 106 needs to accept or reject some value based on the current state. As an example, the image processing module 106 can use the machine learning techniques to intelligently decide which features are more relevant versus others in order to provide more accurate pose calculation. The same regression and data analysis is valid for many classification tasks.

Figure 9:
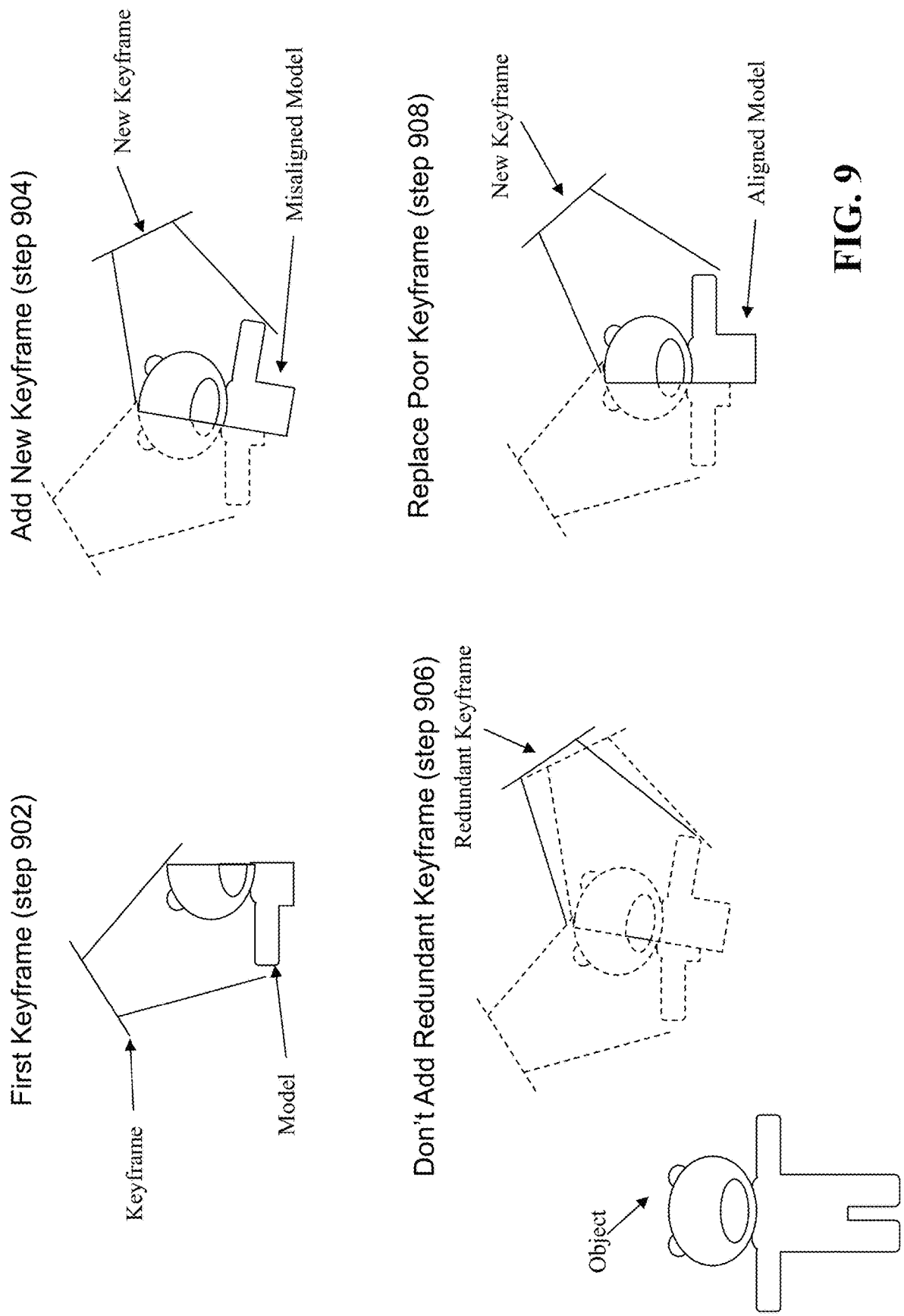
FIG. 9 is a workflow diagram of insertion and evaluation of keyframes.

Turning back to FIG. 2, once the tracking and validation (204) is complete, the image processing module 106 determines whether to keep the optimized frame and if so, the image processing module 106 selects (206) the optimized frame as a keyframe. For example, the current loose frame is considered for inclusion in the keyframe set based on a number of criteria, including uniqueness of position, strength of color features, confidence of the pose estimate, and presence of foreground noise. Once a keyframe is inserted, the module 106 re-evaluates nearby keyframes to see if those nearby keyframes are now redundant. If so, the module 106 removes them, erasing their influence on the TSDF and object boundary. Removing low-quality keyframes helps improve both cropping and tracking of future frames, creating a positive feedback loop that improves overall model quality. FIG. 9 is a workflow diagram of insertion and evaluation of keyframes, using the system 100 of FIG. 1. As an example, the object being scanned is a teddy bear. As shown in FIG. 9, the image processing module 106 captures a current loose frame as a first keyframe (step 902) that includes a model of the object. The image processing module 106 adds other keyframes—for example, the module 106 can add a new keyframe (step 904); however, this keyframe may include a misaligned model of the object. The module 106 can still determine whether nearby keyframes are now redundant (step 906)—even for keyframes that may contain a misaligned model. The module 106 does not add the redundant keyframes. Then, the module 106 can remove poor or low-quality keyframes (step 908) and in some cases, can replace the removed keyframes with new keyframes that are of better quality.

As mentioned above, the keyframe has previously been labeled to identify, e.g., either background, foreground noise, object, or unknown pixels. The image processing module 106 uses the keyframe labels to create probabilistic labels of the volumetric model. For each voxel in the volumetric model, the image processing module 106 projects the voxel to each keyframe and determines what information both the label (e.g., background, foreground noise, object, or unknown) and depth map can give about that location in space. For instance, by counting the number of times a particular voxel appears as either background, object, or in front of any depth point, the module 106 estimates the probability that the voxel either contains an object point or is empty. The module 106 then uses this estimate to influence future labels. For instance, if a new depth point under consideration lies in a voxel with a large chance of being empty then the module 106 can label the depth point as foreground noise, whereas if the voxel is frequently labeled as object, then the new point is probably an object point as well and the image processing module 106 can label the depth point as object.

Figure 6:
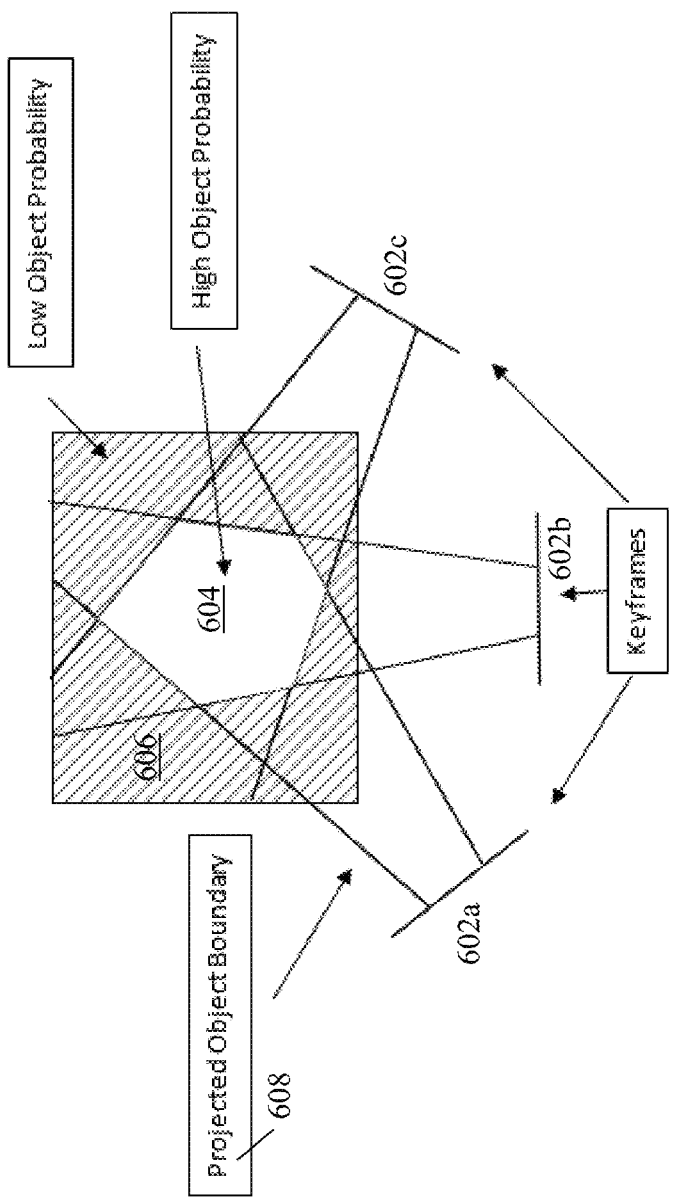
FIG. 6 is a diagram showing an exemplary volumetric probability model technique.

FIG. 6 is a diagram showing an exemplary volumetric probability model technique used by the image processing module 106. As shown in FIG. 6, the image processing module 106 projects each voxel to each keyframe 602a, 602b, 602c and determines a probability that each voxel is part of the object (i.e., high object probability, white region 604) or is not part of the object (i.e., low object probability, shaded region 606). The image processing module 106 also determines a projected object boundary 608.

It should be appreciated that, depending on the quality of the input depth data and the available processing resources on the computing device 104 platform, the image processing module 106 may not have enough information to reconstruct a smooth model. For example, if keyframes are noisy, the module 106 needs more keyframes to smooth out that noise. If the image processing module 106 and/or computing device 104 in general have limited memory, the module 106 needs to use fewer keyframes. In environments that are both noisy and constrained, the module 106 needs to combine multiple depth maps into a single keyframe. To do this, the image processing module 106 keeps a set of approximately thirty of the most recent aligned depth images. When the module 106 selects an image to be a keyframe, the module 106 can combine the depth map of the selected frame with the set of most recent aligned depth maps, smoothing out noise and increasing the amount of information available in a single keyframe. Where a typical model may need three hundred good input frames to produce a high quality model, the module 106 can use fifty multi-frame keyframes and get the same quality results. This also allows the module 106 to run post-processing model adjustment faster than otherwise. Because many frames are already combined into one, there are fewer keyframes to adjust and optimize.

Figure 10:
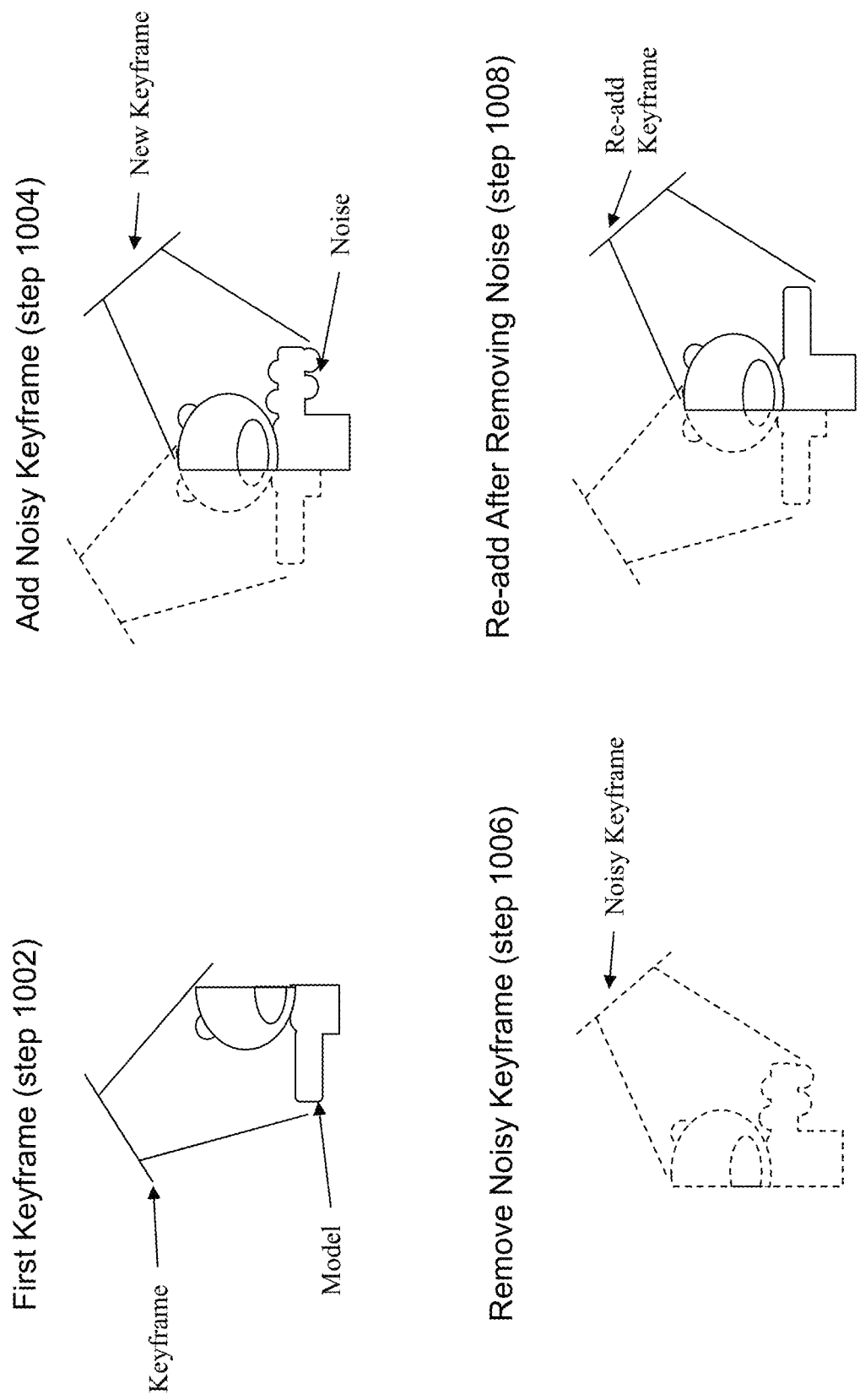
FIG. 10 is a workflow diagram of removing noisy keyframes and re-adding keyframes after removing noise.

Continuing with FIG. 2, the image processing module updates (208) the volumetric model using the selected keyframe. The volumetric model is an implicit surface defined by the estimated distance from each cell in the volume to the true surface of the object. The biggest advantage of maintaining a keyframe-based model is the ability to easily modify the model to add, remove, or readjust input data to fix errors. In some embodiments, the image processing module 106 adds a keyframe to the volumetric model by averaging in the distance from each cell to the object's surface found in the keyframe. The module 106 can then remove the keyframe by subtracting this distance back out from the (potentially updated) cell average. Readjustment is equivalent to removing a keyframe and then re-adding it. There are generally three major sources of model error encountered during object reconstruction: noise, drift, and cutoff. Noise occurs when non-model points are incorrectly added to the model. In the present system, this may happen when the image processing module 106 incorrectly labels a portion of an input point cloud as part of the object. The portion then gets incorporated into the model, creating erroneous surfaces. To address this, the module 106 gradually relabels keyframes as more accurate model information is gathered. FIG. 10 is a workflow diagram of removing noisy keyframes and re-adding keyframes after removing noise, using the system 100 of FIG. 1. As shown in FIG. 10, the image processing module 106 captures a current loose frame as a first keyframe (step 1002) that includes a model of the object. Then, the image processing module 106 may add a new keyframe that includes noise (step 1004)—e.g., the arm of the teddy bear is not smooth. The module 106 can remove the noisy keyframe (step 1006) and eliminate the noise (e.g., by smoothing the keyframe) then re-add the keyframe (step 1008) after removing the noise.

Drift occurs when the object is first scanned in a 360-degree arc. When a loop is first closed around the object, every small drifting error from frame to frame is added together to create a large error between the initial object pose and the current object pose. This means that keyframes taken from disparate times in the frame sequence do not line up with each other. As noted previously, the module 106 detects this during tracking, when the current input data may line up very well with one reference keyframe but not another. The image processing module 106 fixes this problem by identifying the magnitude of the pose error and optimizing the keyframe poses to reduce this error. Once the keyframes are optimized, the module 106 can rebuild the volumetric model and continue scanning. The last model error mentioned above is cutoff, which occurs when the probabilistic labeling is incorrect and a voxel that should be part of the object is labeled as empty. This happens both when keyframe labeling is wrong and when the keyframe pose has some error. In both cases, the solution is as discussed before, namely to relabel the keyframe or adjust its pose to improve alignment.

Finally, the image processing module 106 processes (210) the updated volumetric model to generate a final 3D model. It should be appreciated that, during scanning, especially with inexperienced users, it is fairly easy to lose tracking on the object. The naive strategy when this happens is to try to re-localize the object before continuing to scan. This requires the user to return the object to some previously scanned pose, perhaps trying several poses if re-localization is not working well. As a result, scanning time and user frustration increases.

To avoid this, the system 100 makes use of the fact that the volumetric model can be reconstituted from any set of keyframes. The image processing module 106 starts by creating a new volumetric model, then merges this new model into the old model once the module 106 is able to register the two together. This allows the user to continue to scan and make progress on the model. While this new model is being built, the image processing module 106 searches for a registration between the new model and old model in a separate processing thread, then seamlessly merges the two together once the registration is found. If a registration cannot be found, the module 106 can wait and let the new model grow more detailed, making a second attempt at registration more likely to succeed. Merging the two models involves transforming the new model's keyframes into the coordinate system of the old model, combining all keyframes into one set, then rebuilding the volumetric model.

Figure 11:
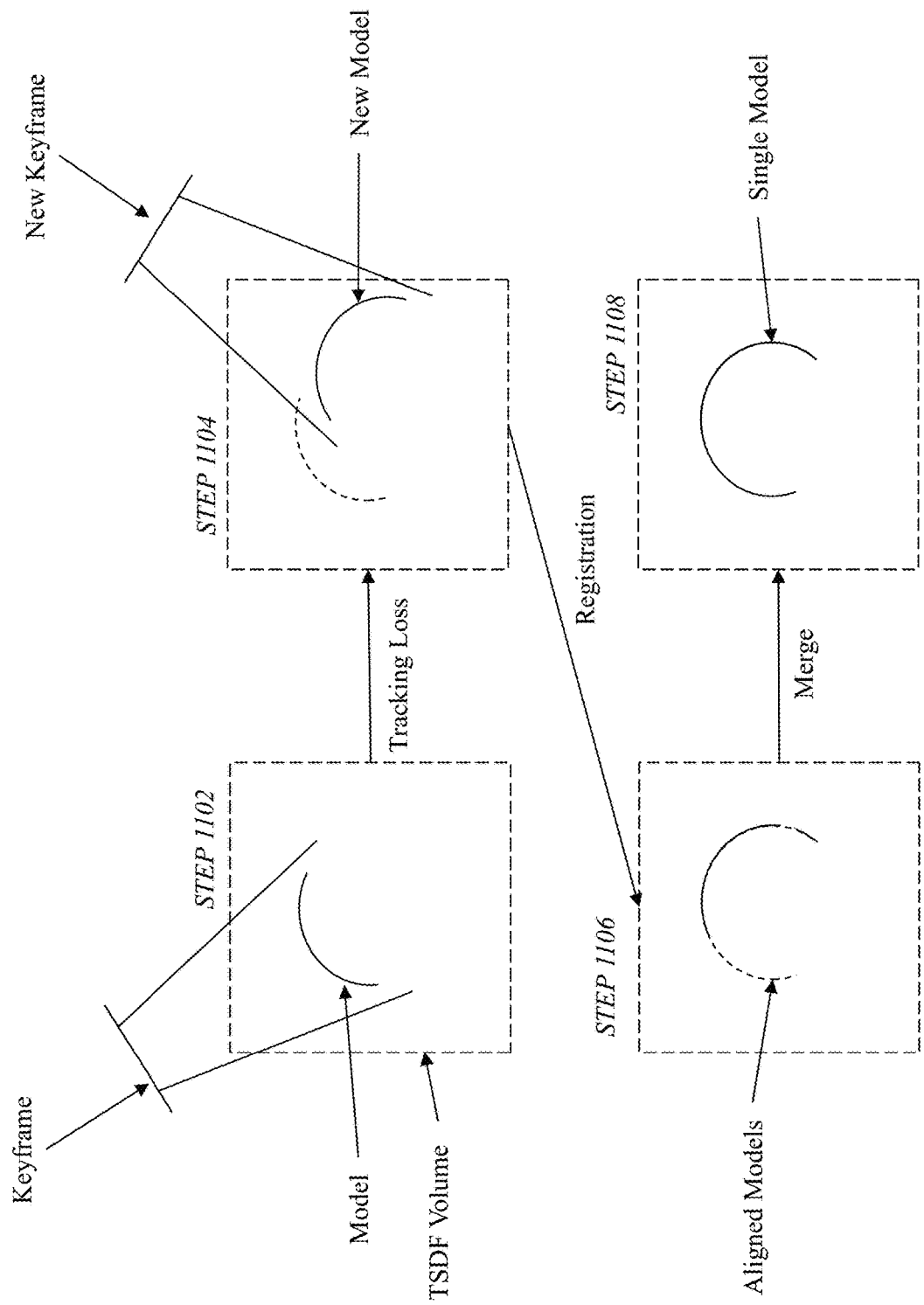
FIG. 11 is a workflow diagram of registration and merging of the volumetric model during tracking loss.

FIG. 11 is a workflow diagram of registration and merging of the volumetric model during tracking loss, using the system 100 of FIG. 1. The image processing module 106 generates a model (step 1102) using the TSDF volume and keyframe. If tracking is lost while the image processing module 106 builds the model using a new keyframe, the module 106 can simply create a new model (step 1104). The module 106 then searches for a registration between the new model and old model in a separate processing thread (step 1106)—for example, given any number of models, the module 106 repeatedly tries to combine the current model with any of the older ones. Once the module 106 finds a registration between an old model and the new model, the module 106 merges the two models together (step 1108). This eventually leads back to a single unified model once the object has been fully scanned.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for keyframe-based object scanning and tracking, the system comprising:
   a sensor device that captures a plurality of images of one or more objects in a scene;
   a computing device coupled to the sensor device, the computing device comprising a memory that stores computer-executable instructions and a processor that executes the instructions, for each image of the plurality of images, to:
   label each of at least a plurality of pixels in the image as either a background pixel, a foreground noise pixel, an object pixel, or an unknown pixel;
   track at least one region of the labeled image to determine an estimate of a current pose of at least one of the one or more objects, wherein the at least one region is determined by the labeled pixels, comprising:
   rendering an anchor depth map based upon an implicit surface of the at least one of the one or more objects, the implicit surface defined by a Truncated Signed Distance Function (TSDF);
   identifying one or more reference keyframes based upon the labeled image;
   defining first error terms between the labeled image and the anchor depth map using Iterative Closest Point (ICP);
   defining second error terms between the labeled image and the one or more reference keyframes based upon matching features; and
   minimizing the first error terms and the second error terms to determine the estimate of the current pose of the at least one of the one or more objects;
   validate the estimate of the current pose of the at least one of the one or more objects;
   select the labeled image as a keyframe based upon validation of the estimate of the current pose of the at least one of the one or more objects; and
   update a volumetric model comprising the at least one of the one or more objects using the keyframe;
   wherein the computing device generates a final 3D model of the at least one of the one or more objects based upon the updated volumetric model.

2. The system of claim 1, wherein validating the estimate of the current pose of the at least one of the one or more objects comprises:
   comparing the estimate of the current pose of the at least one of the one or more objects to a pose of the at least one of the one or more objects in one of the one or more reference keyframes.

3. The system of claim 2, wherein validating the estimate of the current pose of the at least one of the one or more objects comprises:
   generating a feature set using a depth map associated with the labeled image, the anchor depth map, the estimate of the current pose of the at least one of the one or more objects, one or more Oriented FAST and Rotated BRIEF (ORB) features of the at least one of the one or more objects, and one or more of the reference keyframes, wherein the feature set comprises a dense error value and a sparse error value;
   generating a feature vector from the feature set; and
   executing a machine learning classifier on the feature vector to classify the feature vector as corresponding to a correct object pose or an incorrect object pose.

4. The system of claim 3, wherein the machine learning classifier is trained on training data to predict whether an input feature vector corresponds to a correct object pose.

5. The system of claim 3, wherein the machine learning classifier includes a bias value to adjust a classification outcome of the classifier.

6. The system of claim 1, wherein selecting the image as a keyframe based upon validation of the estimate of the current pose of the at least one of the one or more objects comprises:
   identifying one or more of: a strength of color features in the labeled image, a confidence of the estimate of the current pose, or a presence of foreground noise in the labeled image; and
   selecting the labeled image as a keyframe based upon the identified strength of color features in the labeled image, the confidence of the estimate of the current pose, or the presence of foreground noise in the labeled image.

7. The system of claim 6, wherein the computing device evaluates one or more reference keyframes related to the labeled image to determine whether one or more of the reference keyframes are redundant.

8. The system of claim 7, wherein the computing device removes one or more redundant reference keyframes.

9. The system of claim 1, wherein updating a volumetric model comprising the at least one of the one or more objects using the keyframe comprises one or more of:
   adding the keyframe to the volumetric model; or
   removing the keyframe from the volumetric model.

10. The system of claim 9, wherein adding the keyframe to the volumetric model comprises:
    determining a distance from each cell in a surface of the at least one of the one or more objects in the volumetric model to a surface of the at least one of the one or more objects in the keyframe; and
    averaging the determined distance into the volumetric model.

11. The system of claim 10, wherein removing the keyframe from the volumetric model comprises subtracting the determined distance from the volumetric model.

12. The system of claim 1, wherein the computing device generates an initial volumetric model of the at least one of the one or more objects, searches for a registration between the initial volumetric model and the updated volumetric model, and merges the initial volumetric model with the updated volumetric model when a registration is found.

13. A computerized method of keyframe-based object scanning and tracking, the method comprising:
 capturing, by a sensor device, a plurality of images of one or more objects in a scene;
 for each image of the plurality of images:
  labeling, by a computing device coupled to the sensor device, each of at least a plurality of pixels in the image as either a background pixel, a foreground noise pixel, an object pixel, or an unknown pixel;
  tracking, by the computing device, at least one region of the labeled image to determine an estimate of a current pose of at least one of the one or more objects, wherein the at least one region is determined by the labeled pixels, comprising:
   rendering an anchor depth map based upon an implicit surface of the at least one of the one or more objects, the implicit surface defined by a Truncated Signed Distance Function (TSDF);
   identifying one or more reference keyframes based upon the labeled image;
   defining first error terms between the labeled image and the anchor depth map using Iterative Closest Point (ICP);
   defining second error terms between the labeled image and the one or more reference keyframes based upon matching features; and
   minimizing the first error terms and the second error terms to determine the estimate of the current pose of the at least one of the one or more objects;
  validating, by the computing device, the estimate of the current pose of the at least one of the one or more objects;
  selecting, by the computing device, the labeled image as a keyframe based upon validation of the estimate of the current pose of the at least one of the one or more objects;
  updating, by the computing device, a volumetric model comprising the at least one of the one or more objects using the keyframe; and
 generating, by the computing device, a final 3D model of the at least one of the one or more objects based upon the updated volumetric model.

14. The method of claim 13, wherein validating the estimate of the current pose of the at least one of the one or more objects comprises:
 comparing the estimate of the current pose of the at least one of the one or more objects to a pose of the at least one of the one or more objects in one of the one or more reference keyframes.

15. The method of claim 14, wherein validating the estimate of the current pose of the at least one of the one or more objects comprises:
 generating a feature set using a depth map associated with the labeled image, the anchor depth map, the estimate of the current pose of the at least one of the one or more objects, one or more Oriented FAST and Rotated BRIEF (ORB) features of the at least one of the one or more objects, and one or more of the reference keyframes, wherein the feature set comprises a dense error value and a sparse error value;
 generating a feature vector from the feature set; and
 executing a machine learning classifier on the feature vector to classify the feature vector as corresponding to a correct object pose or an incorrect object pose.

16. The method of claim 15, wherein the machine learning classifier is trained on training data to predict whether an input feature vector corresponds to a correct object pose.

17. The method of claim 15, wherein the machine learning classifier includes a bias value to adjust a classification outcome of the classifier.

18. The method of claim 13, wherein selecting the image as a keyframe based upon validation of the estimate of the current pose of the at least one of the one or more objects comprises:
 identifying one or more of: a strength of color features in the labeled image, a confidence of the estimate of the current pose, or a presence of foreground noise in the labeled image; and
 selecting the labeled image as a keyframe based upon the identified strength of color features in the labeled image, the confidence of the estimate of the current pose, or the presence of foreground noise in the labeled image.

19. The method of claim 18, wherein the computing device evaluates one or more reference keyframes related to the labeled image to determine whether one or more of the reference keyframes are redundant.

20. The method of claim 19, wherein the computing device removes one or more redundant reference keyframes.

21. The method of claim 13, wherein updating a volumetric model comprising the at least one of the one or more objects using the keyframe comprises one or more of:
 adding the keyframe to the volumetric model; or
 removing the keyframe from the volumetric model.

22. The method of claim 21, wherein adding the keyframe to the volumetric model comprises:
 determining a distance from each cell in a surface of the at least one of the one or more objects in the volumetric model to a surface of the at least one of the one or more objects in the keyframe; and
 averaging the determined distance into the volumetric model.

23. The method of claim 22, wherein removing the keyframe from the volumetric model comprises subtracting the determined distance from the volumetric model.

24. The method of claim 13, wherein the computing device generates an initial volumetric model of the at least one of the one or more objects, searches for a registration between the initial volumetric model and the updated volumetric model, and merges the initial volumetric model with the updated volumetric model when a registration is found.

* * * * *